US005694578A

United States Patent [19]
Upson et al.

[11] Patent Number: 5,694,578
[45] Date of Patent: Dec. 2, 1997

[54] COMPUTER-IMPLEMENTED METHOD AND APPARATUS FOR CONVERTING DATA ACCORDING TO A SELECTED DATA TRANSFORMATION

[75] Inventors: Craig D. Upson, Woodside; Chee S. Yu, Sunnyvale, both of Calif.

[73] Assignee: Silicon Graphics, Inc., Mountain View, Calif.

[21] Appl. No.: 993,016

[22] Filed: Dec. 18, 1992

[51] Int. Cl.$^6$ .................................................. G06T 3/00
[52] U.S. Cl. .................................................. 395/500
[58] Field of Search .......................... 395/500, 600, 395/800, 352, 335

[56] References Cited

U.S. PATENT DOCUMENTS

| | | | |
|---|---|---|---|
| 4,860,291 | 8/1989 | Damm et al. | 371/27 |
| 4,959,776 | 9/1990 | Deerfield | 395/400 |
| 5,119,465 | 6/1992 | Jack et al. | 395/500 |
| 5,159,669 | 10/1992 | Trigg | 395/159 |
| 5,201,046 | 4/1993 | Goldberg et al. | 395/600 |
| 5,212,650 | 5/1993 | Hooper | 364/489 |
| 5,315,646 | 5/1994 | Babson, III et al. | 379/201 |
| 5,317,676 | 5/1994 | Austvold et al. | 395/26 |
| 5,321,606 | 6/1994 | Kuruma | 364/419.08 |
| 5,371,895 | 12/1994 | Bristol | 395/800 |
| 5,410,675 | 4/1995 | Shreve et al. | 395/500 |
| 5,479,643 | 12/1995 | Bhaskar et al. | 395/500 |

*Primary Examiner*—David Y. Eng
*Attorney, Agent, or Firm*—Sterne, Kessler, Goldstein & Fox P.L.L.C.

[57] ABSTRACT

A computer-implemented method and apparatus allowing a user to select a data transformation for converting input data to output data without having to perform complicated programming. An interactive graphic display provider menu display options which enable a user to generate input and output graphic display templates by selecting data items such as scalars, arrays, lattices, and sets from a data palette. The user then identifies a selected data transformation by making assignments between data items in the input template and the output template. A user interface manager passes information regarding the assignments to a processor which generates a data transform program based on the assignment information. A data chopping module then executes the data transform program to convert input data.

7 Claims, 10 Drawing Sheets

COMPUTER-IMPLEMENTED METHOD AND APPARATUS FOR CONVERTING DATA ACCORDING TO A SELECTED DATA TRANSFORMATION

FIELD OF THE INVENTION

This invention generally relates to the conversion of data through a simplified formation of a conversion program, and more particularly, to the conversion of data structures by the designation of specified inputs and outputs.

BACKGROUND OF THE INVENTION

Essentially, data structures are organized as either scalars, arrays or lattices.

Scalars are primitive data types such as single integers, floating point numbers, single numbers, bytes, and characters. They are used to represent single items in a template or to set the primitive type of a more complex data item, such as an array.

Arrays are homogeneous collections of scalars or other arrays. All nodes of the array are of the same scalar type, for example, all integer or all floating point. They range from one-dimensional arrays (vectors) to four-dimensional arrays. The starting indices and dimensionality of the array can be symbolic expressions.

Lattices exist in three generic forms: uniform, perimeter and curvilinear coordinate mappings. Each form can be one-dimensional, two-dimensional, or three-dimensional. Uniform lattices are grids with constant spacings. Uniform lattices have identical distances between nodes within a coordinate direction, with the exception of two-dimensional or three-dimensional uniform lattices. A perimeter lattice is a cartesian grid that is not uniformly spaced. A curvilinear lattice is an irregularly spaced grid or a body-mapped coordinate system.

Current graphic systems require a user to undertake a complex process, usually involving the formulation of computer programs, in order to convert a data structure desired of being analyzed into a form that is compatible with the user's network. Such conversions also demand an inordinate amount of effort before the data desired to be analyzed is converted. A typical user of a graphical analysis tool is usually unable to invest a substantial amount of time to learn a new system. Thus, conventional graphic systems are too complex and tedious for performing typical data structure conversion tasks.

SUMMARY OF THE INVENTION

The present invention overcomes the aforementioned deficiencies of the prior art by providing a method and apparatus for converting data through the formation and execution of specified conversion programs.

The present invention consists of a structure for converting extraneous data to forms which are capable of being analyzed. Such structure only requires the user to characterize the data structure sought to be converted and the characteristics of the resulting data structure.

The focus of the present invention provides an environment wherein user applications are made more simplistic. Hence, such applications assist a user in making effective use of a workstation for data conversion.

DETAILED DESCRIPTION OF THE INVENTION

Computer System

Figure 1:
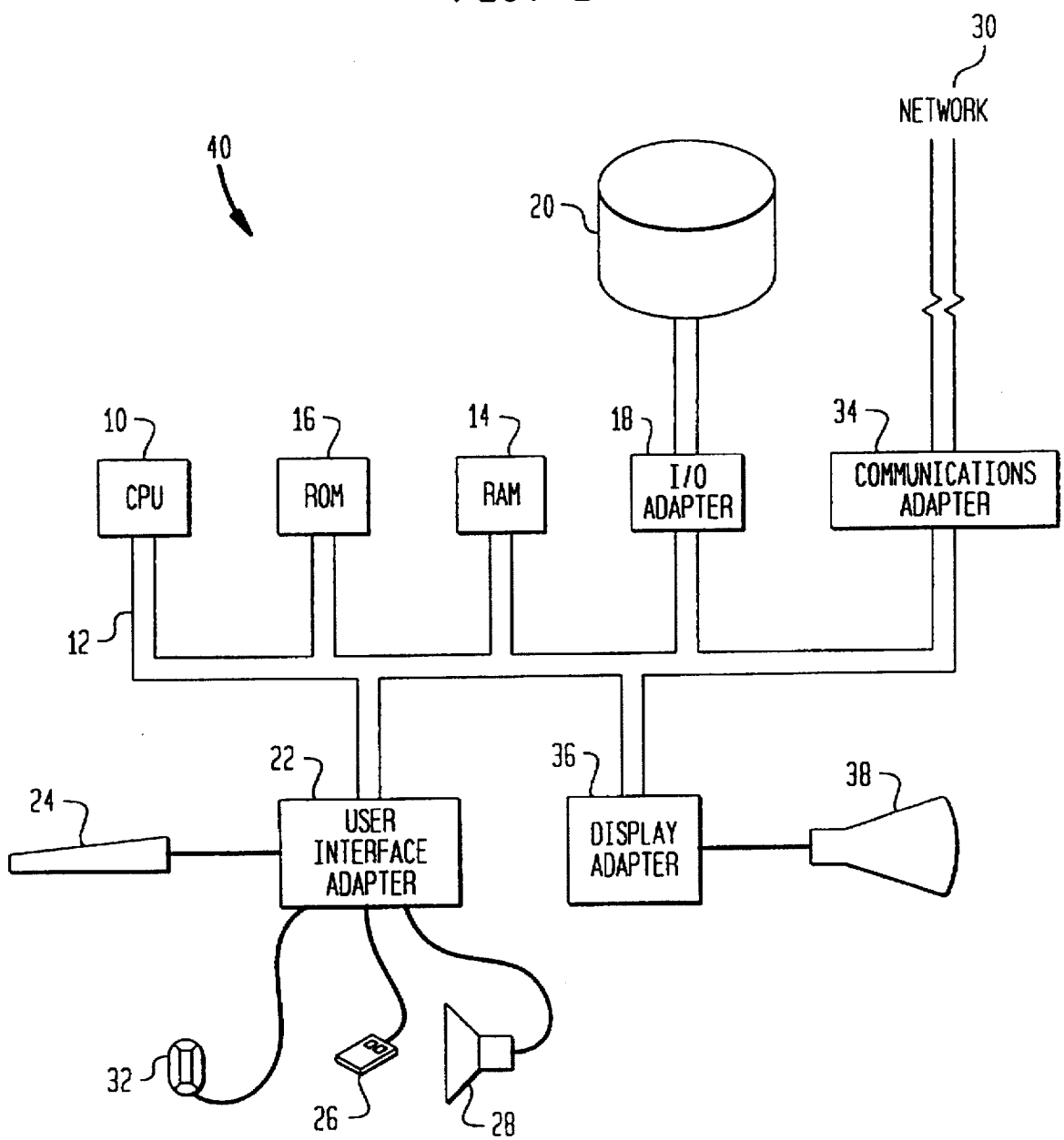
FIG. 1 is a block diagram of a computer system in accordance with the present invention.

A representative hardware environment is depicted in FIG. 1, which illustrates a suitable hardware configuration of a workstation 40 in accordance with the present invention. The workstation 40 has a central processing unit 10, such as a conventional microprocessor, and a number of other units interconnected via a system bus 12. The illustrated workstation 40 shown in FIG. 1 includes a Random Access Memory 14 (RAM), a Read Only Memory 16 (ROM), an I/O adapter 18 for connecting peripheral devices such as disk 20 units is to the bus 12, a user interface adapter 22 for connecting a keyboard 24, a mouse 26, a speaker 28, a microphone 32, and/or other user interface devices such as a touch screen device (not shown) to the bus 12. The workstation 40 may also have a communications adapter 34 for connecting the workstation 40 to a data processing network 30 and a display adapted 36 for connecting the bus 12 to a display device 38.

Conversion System Enviroment

The preferred embodiment of the present invention operates within the environment of three types of components which analyze the converted data through the execution of analytical programs. The three types of components are: (i) a component concerned with the construction and modification of programs, (ii) a component concerned with supporting the execution of the programming model, and (iii) components to support ancillary functions.

The components that form the environment of the present invention may be decomposed into functional blocks. These functional blocks interact in well-defined ways to form the basis of an analytical device. Many of the functional blocks require interaction with the user, while other functional blocks have no interactions with user.

Figure 2:
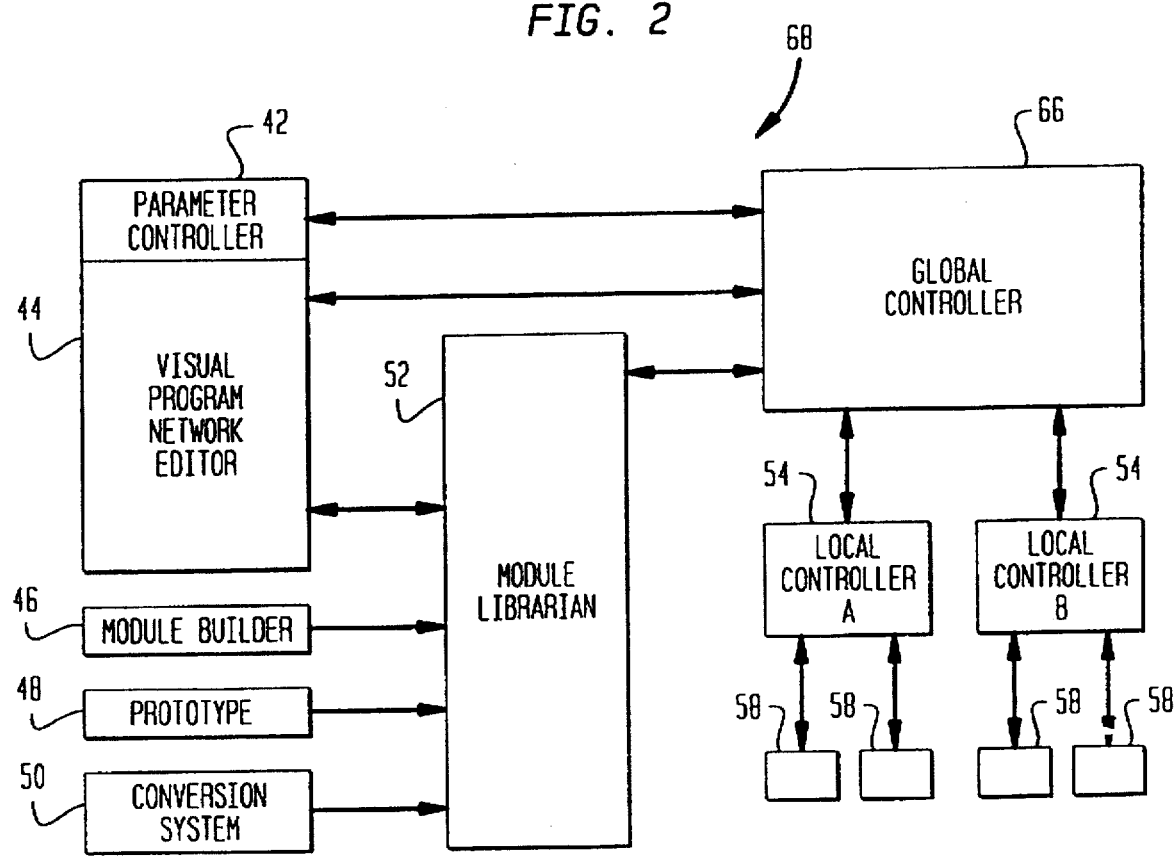
FIG. 2 illustrates a top-level flowchart of the functional blocks within the system environment of the preferred embodiment of the present invention.

Referring to FIG. 2, a top-level flowchart which illustrates the functional blocks of the environment from which the preferred embodiment of the present invention operates. As illustrated by FIG. 2, the module builder 46, the prototype 48, and the conversion system 50 are distinct functional blocks that are capable of transferring information to the module librarian 52.

The module librarian 52 is further connected to both the global controller 66 and the network editor 44. The global controller 66 and parameter controller 42 are also directly connected with each other. In addition, the global controller 66 is further connected to each local controller 54 which, in turn, are connected to the configured modules 58 of each workstation.

The process of building an analytical program, which is an interconnection of functional modules 58, involves designing a program network and then entering that design into a workstation 40. The component responsible for this activity is called the program network editor 44. The network editor 44 does not design the program, but it provides a user with information concerning design possibilities in order to ease the design process. The network editor 44 operates in conjunction with a graphical user interface to design analytical program networks.

The components concerned with the construction and modification of program networks include (i) the module builder 46, and (ii) the module prototype 48.

Modules may be construed by the module builder 46. The module builder 46 provides a convenient way for a user to construct a module 58 by only requiring the user to characterize the interfaces to a module 58. Specifically, the user need only specify certain aspects of a module: the input and output data in terms of ports, its parameters, the calling sequence to the programmer-supplied computational routines, and any special features the module may have.

The module builder 46 operates by gathering the specification information of the user and then generating a module control wrapper and module data wrapper which are tailored to the new module 58. Such a process entails the generation of executable code as well as statically unitized tables which will be ultimately compiled and linked with the user's supplied portions. It should be noted that the present invention, the data conversion utility, operates like the module builder 46.

Modules 58 for performing simplistic computations on well known data types can be retrieved through the use of a module prototype 48. The module prototype 48 is capable of creating a short segment of code that will be automatically wrapped and converted into a module 58.

Once modules 58 are created, they are stored in the module library which is managed by means of the module librarian 52. Unlike the module builder 46, the module librarian 52 is not an isolated component. Rather, it is linked into each component that requires its functions.

The preferred embodiment of the present invention also operates within an environment that includes three major components for supporting the execution of a designed program network: (i) a global controller 66, (ii) one or more local controllers 54, and (iii) module wrappers.

The global controller 66 is the central repository for information about an executing program, its topology, parameter values, and any other necessary network-wide knowledge. The global controller 66 communicates with other components of the environment through a protocol which is communicated by means of an interprocess communication mechanism. One element of that protocol allows for the modification of program parameters. Such modifications come from another portion of the environment, namely, the parameter controller 42.

The parameter controller 42 provides a display screen to the user. Additional parameter controllers 42, such as the graphical user interface and the ASCII user interface, exist to provide with additional interfaces.

A further component, the local controller 54, is responsible for managing resources of the network programs of a particular host workstation. The local controller 54 functions as an agent of the global controller 66 for each workstation involved in a program. Thus, there is one local controller 54 for each workstation involved. A local controller 54 is responsible for: process invocation and deactivation upon a module 58, destruction, process monitoring and control of each module 58 to detect exceptional conditions, shared memory management of modules 58, link creation of modules 58, and message relay between a graphical controller and any modules 58.

The modules 58 of a program define the computation performed. Each module 58, however, is linked with components that manage its communication, firing, and memory allocation. These components are called modules wrappers and are identified by two distinct instances: (i) the module control wrapper and (ii) the module data wrapper. The module control wrapper hides the complexities of the inter-module communication and shared memory management from other parts of a module. In contrast, the module data wrapper hides the representation of data types from naive modules.

The module librarian 52 is the repository for all information about the state of a module 58, an application network, or a composite control panel. Additionally, the module librarian 52 is used by the components of the present invention to save and restore their state.

Conversion System Utility

The conversion system allows a user to convert data in a given structure into a desired data structure. Initially, the user constructs a visual graphical input template that describes the structure of the input data to the present invention. Only those pieces of data that are necessary for construction of the output structure need be described. Thus, the present invention can be operated in such a manner that uninteresting pieces of an input data structure are ignored.

Thereafter, the user constructs a visual graphical output template which describes the desired structure of the output data. Finally, the user describes the manner in which the output data structure is to be constructed from the input data structure. Such a description is accomplished by selecting pieces of the input data template and "assigning" those pieces to the corresponding pieces of the output template. The present invention will then evaluate the description and generate a data chopping or scribe module 94 which will carry out the data conversion specified by the user. The end result is a data transform.

Data scribe modules 94 can be utilized in several ways within the preferred embodiment of the present invention. A data scribe module 94 can be utilized to retrieve data into a particular network by converting data stored in a foreign data file into one or more types of data which are compatible with the present invention. Also, the module may be used for exporting data structures that are compatible with the network of a user into foreign data structures. Further, the data scribe module 94 may be employed to convert between data structures compatible with the present invention and data structure required by a foreign application in the network of a user.

The function of a template is to describe a class of data structures. The conversion system then applies the class description of the user to instances of such a class by utilizing information within the data structure. The user can thus use the identical template for many diverse instances of a particular data structure. In addition, the user can specify several output data templates, and interactively choose between the different outputs when executing the present invention.

Conversion System Architecture

The conversion system consists of two main components: (i) the data editor 98 and (ii) the data scribe module 94. The data editor 98 is employed to compose a description of the desired data transformation whereas the data scribe module 94 carries out the desired data transformation.

Figure 3:
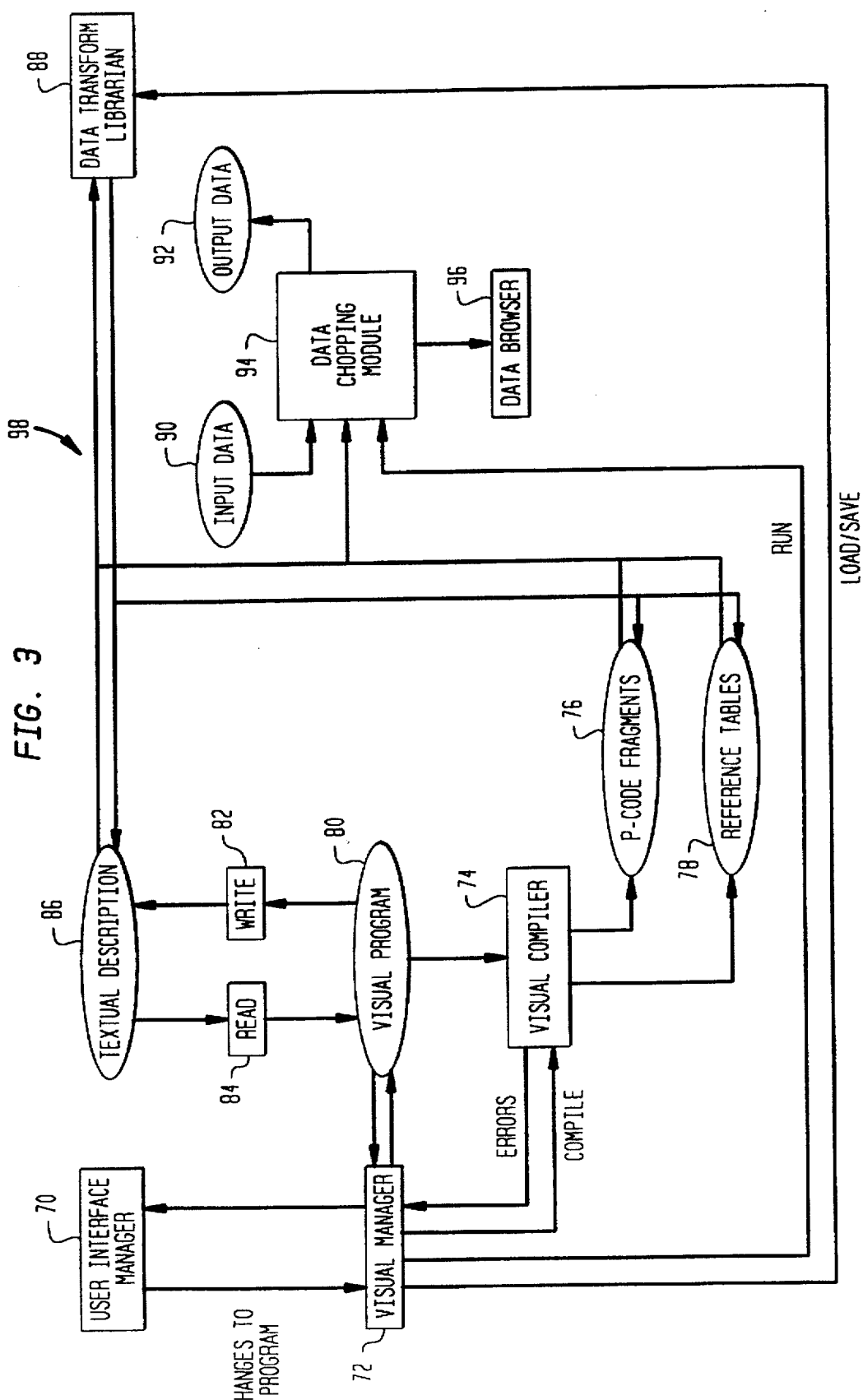
FIG. 3 illustrates the architecture of the data editor component of the present invention.

Referring to FIG. 3, the architecture for the data editor is illustrated. The user interface manager 70 administers all interactions between the data editor 98 and the user. Furthermore, the user interface manager 70 undertakes the initial interpretation of a user gesture and the display of data transforms. A gesture that does not alter the data transform program is undertaken by the user interface manager 70. In contrast, gestures that change the data transform, such as the placement of a data item into a template, causes a message to be sent to the visual manager 72.

The visual manager 72 element of the data editor 98 interprets the change message sent by the user interface manager 70. Initially, the visual manager 72 checks the validity of the message. An error message will be sent back to the user interface manager 70 in the event that the change message is invalid or inappropriate. A valid message causes the visual manager 72 to construct the specified structure, selections, and assignments.

Three types of messages can be executed by the user: a refinement message, a selection message and an assignment message. A refinement message is the addition, removal, or modification of a data item to a template. A selection message signifies a user selection within the templates. An assignment message establishes an assignment between selections.

The visual manager 72 will attempt to propagate an assignment message across other related assignments. For instance, if there is an existing assignment that A is equal to B, and the user sets the value of A to C, then the data editor will also set the value of B to C. The user will then be asked to decide whether or not a value should be propagated if the propagation causes value conflicts. The visual manager 72 communicates the results of these changes to the user interface manager 70.

The visual manager 72 is connected to the visual compiler 74 and converts the data transform specification into a program which carries out the data transform. The output of the visual compiler 74 produces p-code fragments 76 for all templates as well as a data reference table 78 for each output template. The p-code fragments 76 for an input template extract values of input data components from the input data. The p-code fragments 76 for an output template constructs the output data structure. The data reference table 78 indicates the data values that are referenced within the assignments which are used to construct a particular output template. The use of the data reference table 78 allows the conversion system to only compute those input values that are needed to construct the output while ignoring inessential input values.

The visual manager 72 is also connected by a dual feed with a visual program 80. The visual program 80 is further connected in a chain with a write 82 element, a textual description 86 program and a read 84 element. The output of the visual program 80 is sent to the write 82 element. Thereafter the write 82 element inputs the textual description 86 program which sends its output to the read 84 element. In turn, the read 84 element sends its output to the visual program 80.

The data transform librarian 88 allows for data transforms to be stored within it. In addition to receiving the p-code fragments 76 and reference table 78 from a given data transform, the data transform librarian 88 is also connected to the visual manager 72 for load/save instances. Each complete data transform contains three pieces: the textual description 86, the p-code fragments 76, and the reference tables 78 of the data transform. A complete data transform will require all three pieces in order for the data scribe module 94 to execute. An incomplete data transform may, however, be stored within the data transform librarian 88. An incomplete data transform may result from work in progress or libraries of clip-templates, which are useful templates or template components that can be utilized.

The textual description 86, p-code fragments 76, reference tables 78 of a particular data transform, and input data 90, and a run prompt from the visual manager 72 are all inputted to the data scribe module 94. In turn, the data scribe module 94 yields output data 92 as well as input to the data browser 96 element.

The data editor 98 is capable of detecting certain user mistakes. The user interface manager 70 and the visual manager 72 will disclose all syntax errors and some semantic errors. In addition, the data browser 96 provides a debugging capability for the conversion system.

The user can connect a sample data file to the debugging data scribe module 94 in the data editor 98 for the sole purpose of debugging. The data scribe module 94 will then decipher the sample data according to the current data transform and subsequently feed the results to the data browser 96. Ultimately, the data browser 96 displays the interpreted sample data in a format similar to the template, with visual links to the corresponding parts of the template. Both the input templates and the output templates can be examined by the data browser 96. The present invention also has the capability of receiving an ASCII value in the data browser 96 and inserting the format of the ASCII data structure into a template.

Figure 4:
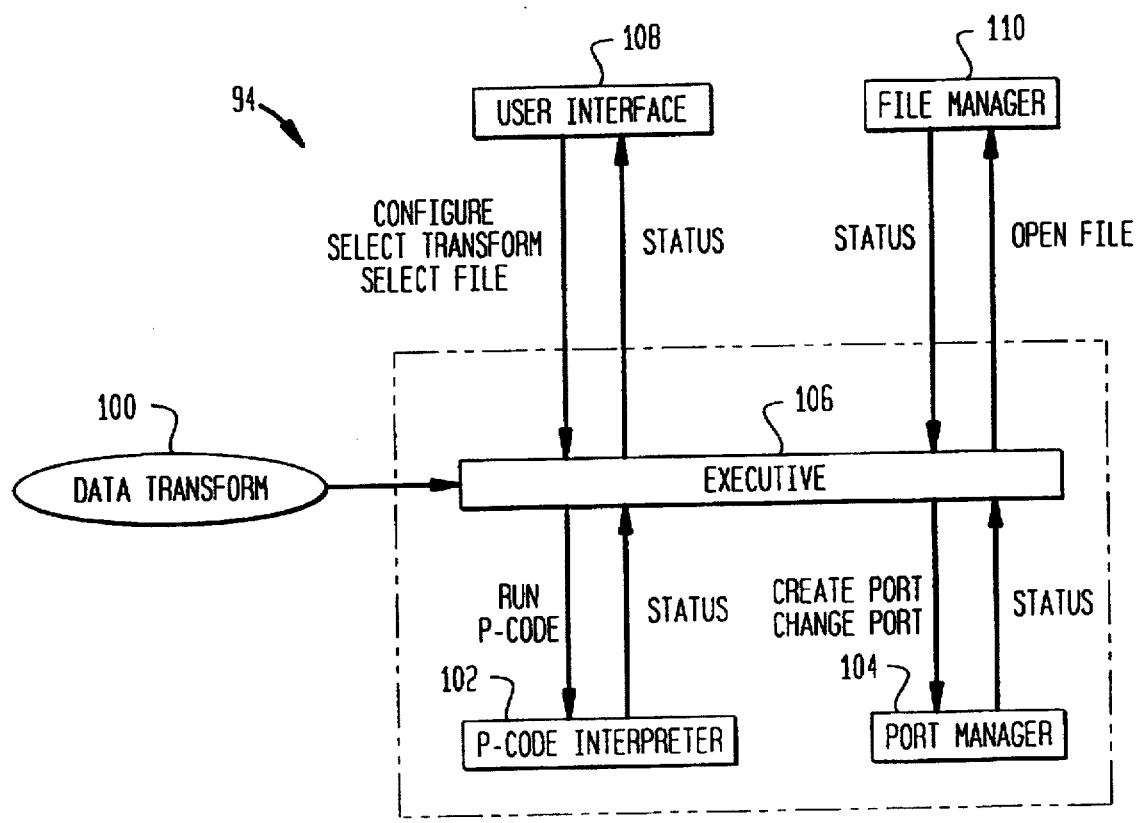
FIG. 4 illustrates the architecture of the data scribe module component of the present invention.

Referring to FIG. 4, the architecture of the data scribe module 94 is illustrated. The executive element 106 is placed at the center of the data scribe module 94. The data scribe module 94 is connected to four elements: to the user interface 108, the file manager 110, the p-code interpreter 102 and the port manager 104. Furthermore, the output of the data transform is received by the executive element 106.

The executive element 106 of the data scribe module 94 is responsible for interpreting external commands and initiating the appropriate responses. When a new output type is selected by the user, the executive element 106 causes the use and reference tables 78 to be redeveloped. When a new data transform is selected by the user, the executive element 106 is responsible for reconfiguring the conversion system. To do this, the executive element 106 determines a new set of input and output ports required to determine the new data transform. Thereafter, the executive element 106 invokes the port manager 104 to formulate the newly determined ports. In addition, the executive element 106 loads the appropriate data transform and forms the appropriate reference tables 78.

The file manager 110 is utilized to designate appropriate input and output file streams. The p-code interpreter 102 element executes the p-code, within an environment that has been customized by the executive element 106, including the reference table 78. Depending upon the selected output templates, the executive element 106 determines which of the p-code fragments 76 should be executed and the p-code interpreter 102 simply executes the block of p-code instructions.

Conversion System Operation

The conversion system 50 is utilized to compose and modify a data structure transformation. Each instance of data structure transformation consists of: one or more input templates, one or more output templates, and one or more assignments. Input templates describe the input data structure whereas output templates describe the structure of the desired output data. Assignments describe a user desired computation which constructs the output template(s) from the contents of the input template(s).

Each template contains a set of various data items. Each data item further contains elements and components that describe the magnitude of the data item. All data items, elements and components can be chosen from a data palette that contains a number of data types. Each different data type is represented by a glyph on the data palette. By utilizing a "drag and drop" technique, a glyph of a chosen data type may be placed so as to define a data item, an element or a component.

EXAMPLE

A three-dimensional input data structure requires two distinct input template files: a grid file, and a Q-file or results file. The grid file contains the coordinates of each data point which is stored in three vectors: X-Grid, Y-Grid, and the Z-Grid. In addition, the grid file contains a nDims vector which describes the dimensions of the data structure.

The Q-file of a three-dimensional structure contains the data values at each data point. For a two-dimensional data structure file, there are four data values at each point: density, the x-momentum, the y-momentum, and the stagnation energy per unit volume. The Q-file also contains four real values, which are termed fsmach, alpha, re, and time. In addition, the Q-file contains a duplicate copy of the nDims vector.

The data palette 124 displays the available data types. Data types are arranged in the data palette 124 in order of complexity and are identified by color-coded icons, which are termed glyphs. Scalar data types that can be used to create a template are Integer (signed integer) 136, Long (signed long) 138, Short (signed short) 140, UInt (unsigned integer) 156, Ulong (unsigned long) 158, Ushort (unsigned short) 160, Real 190, Float (floating point) 174, Double 176, Char (character) 178. Array data types that can be used to create a template are Vector 142, 2D Array (two-dimensional array) 144, 3D Array (three-dimensional array) 162, 4D Array (four-dimensional array) 164, Pattern 180. Lattice data types that can be used to create a template are Lat 1D (one-dimensional lattice) 146, 1D Unif (one-dimensional uniform lattice) 148, 1D Perim (one-dimensional perimeter lattice) 150, 1D Curv (one-dimensional curvilinear lattice) 152, 2D Lat (two-dimensional lattice) 166, 2D Unif (two-dimensional uniform lattice) 168, 2D Perim (two-dimensional perimeter lattice) 170, 2D Curv (two-dimensional curvilinear lattice) 172, 3D Lat (three-dimensional lattice) 182, 3D Unif (three-dimensional uniform lattice) 184, 3D Perim (three-dimensional perimeter lattice) 186, 3D Curv (three-dimensional curvilinear lattice) 188. A set data type that can be used to create a template is Set 154.

The data palette 124, containing glyphs of the aforementioned data types, is displayed when the conversion system is invoked. The data palette 124 can also be hidden and redisplayed. After the data palette is displayed, data types can be copied from the data palette to a template by employing a "drag and drop" technique with the glyph of the data type.

Figure 5:
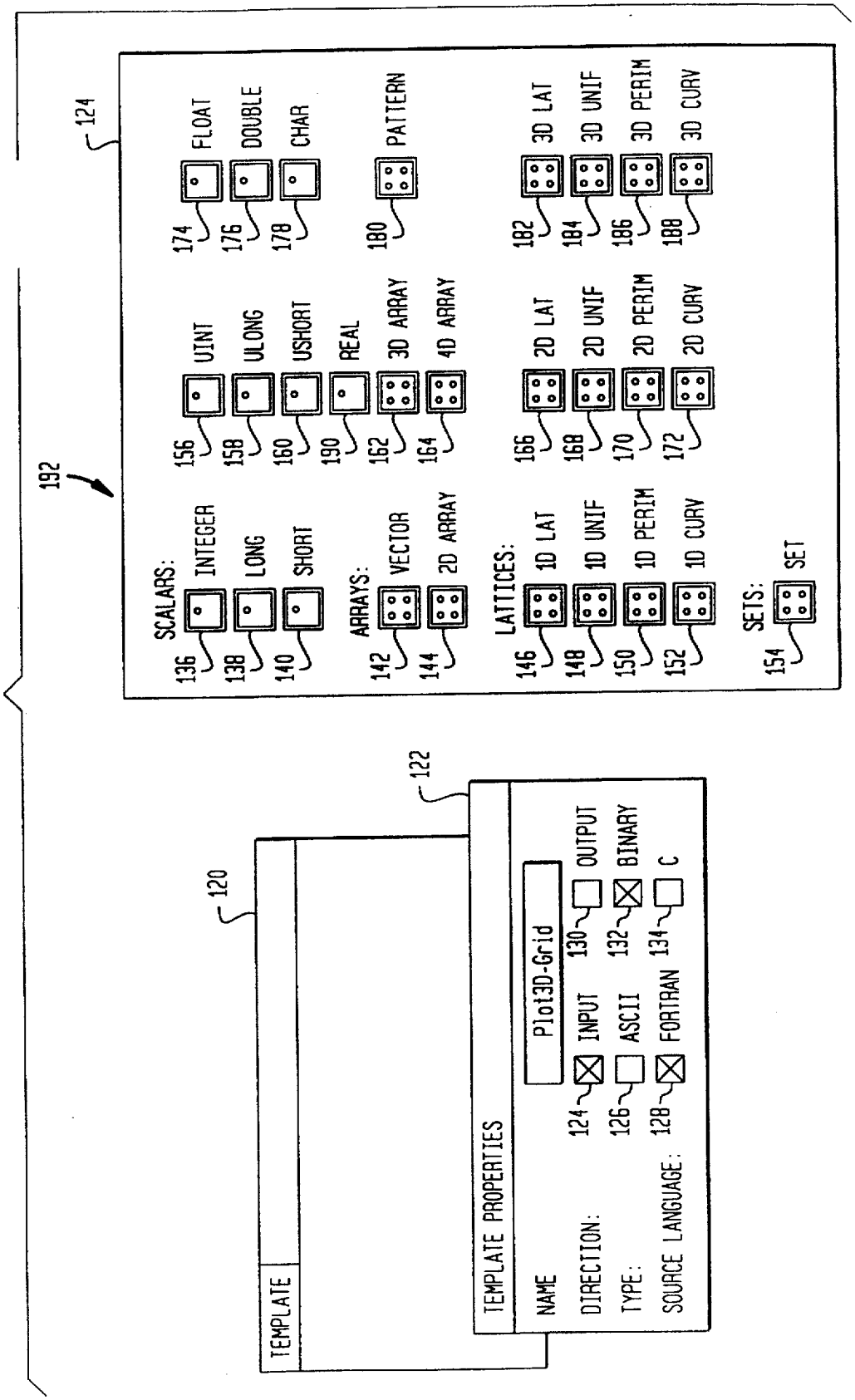
FIG. 5 illustrates the data palette of the present invention and composition of an input template grid file by employing the template item and dialog box of the present invention.

Referring to FIG. 5, the data palette 124, template item 120 and dialog box 122 of the present invention are illustrated. As illustrated, the initial step in forming a template requires the user to specify the general properties of the input data structure in the dialog box 122 including: the name given to the input template file 204, the direction of the template (input 124 or output 130), the type of data structure (ASCII 126 or binary 128), and the source language of the data structure (Fortran 128 or C 134). The input template formed in FIG. 5 concerns itself with a grid file and has been named PLOT3D-Grid 204.

Figure 6:
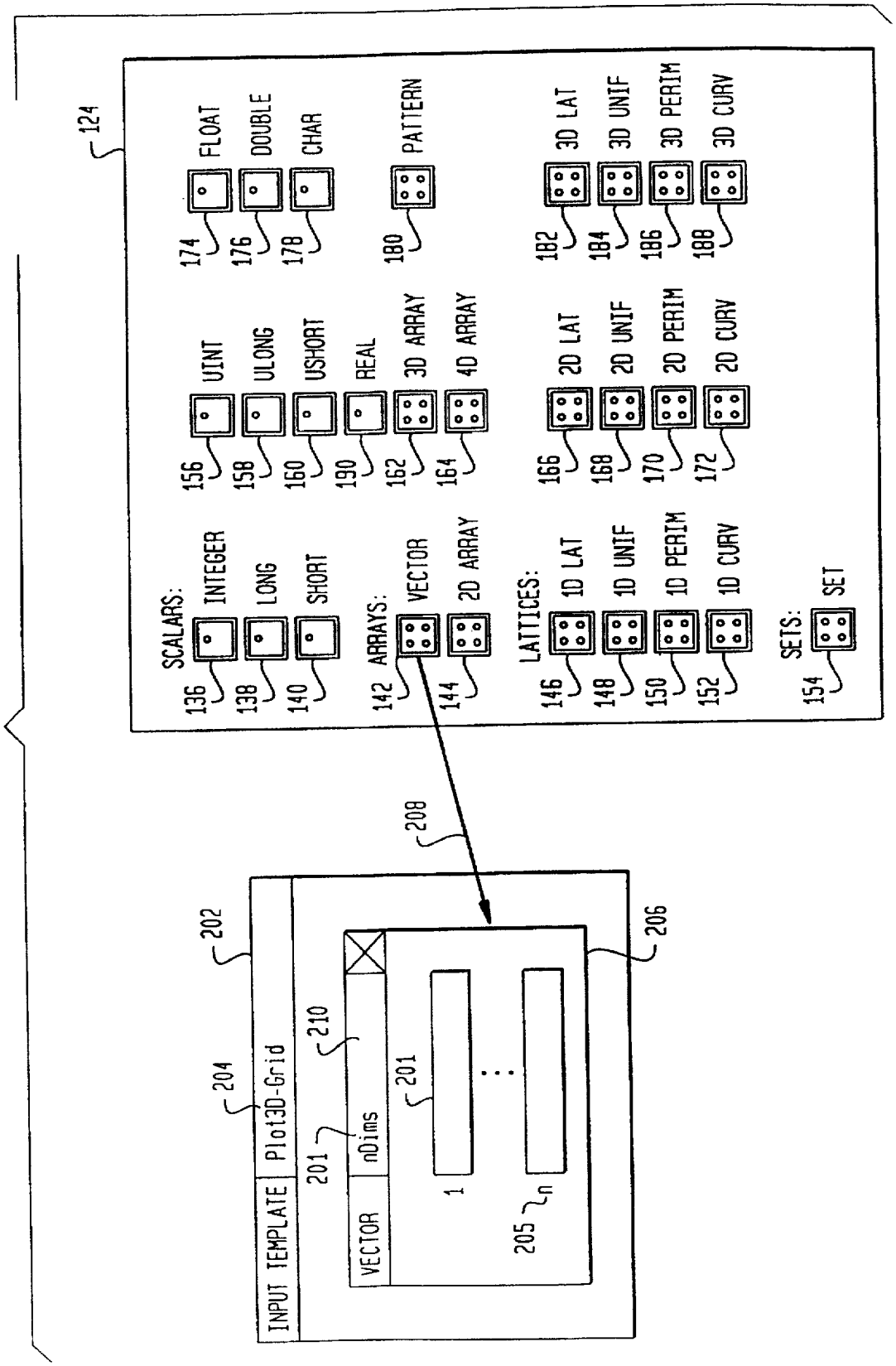
FIG. 6 illustrates a selection of a vector array item from the data palette and its placement into a input template grid file.

Referring to FIG. 6, the description of the PLOT3D-Grid input template 202 is composed by selecting the vector data type 142 glyph from the data palette 124 and placing it within the template by the "drag and drop" technique 208. This forms vector item 206. A composite data item, such as vector item 206, can be displayed in either a terse form in a verbose form. In the verbose form, the contents of the composite is exposed to the user. Vector data item 206, given the name nDims 210, is initially displayed on the PLOT3D-Grid input template 202 in verbose form since there are elements of the vector data item 206 which need to be specified.

Figure 7:
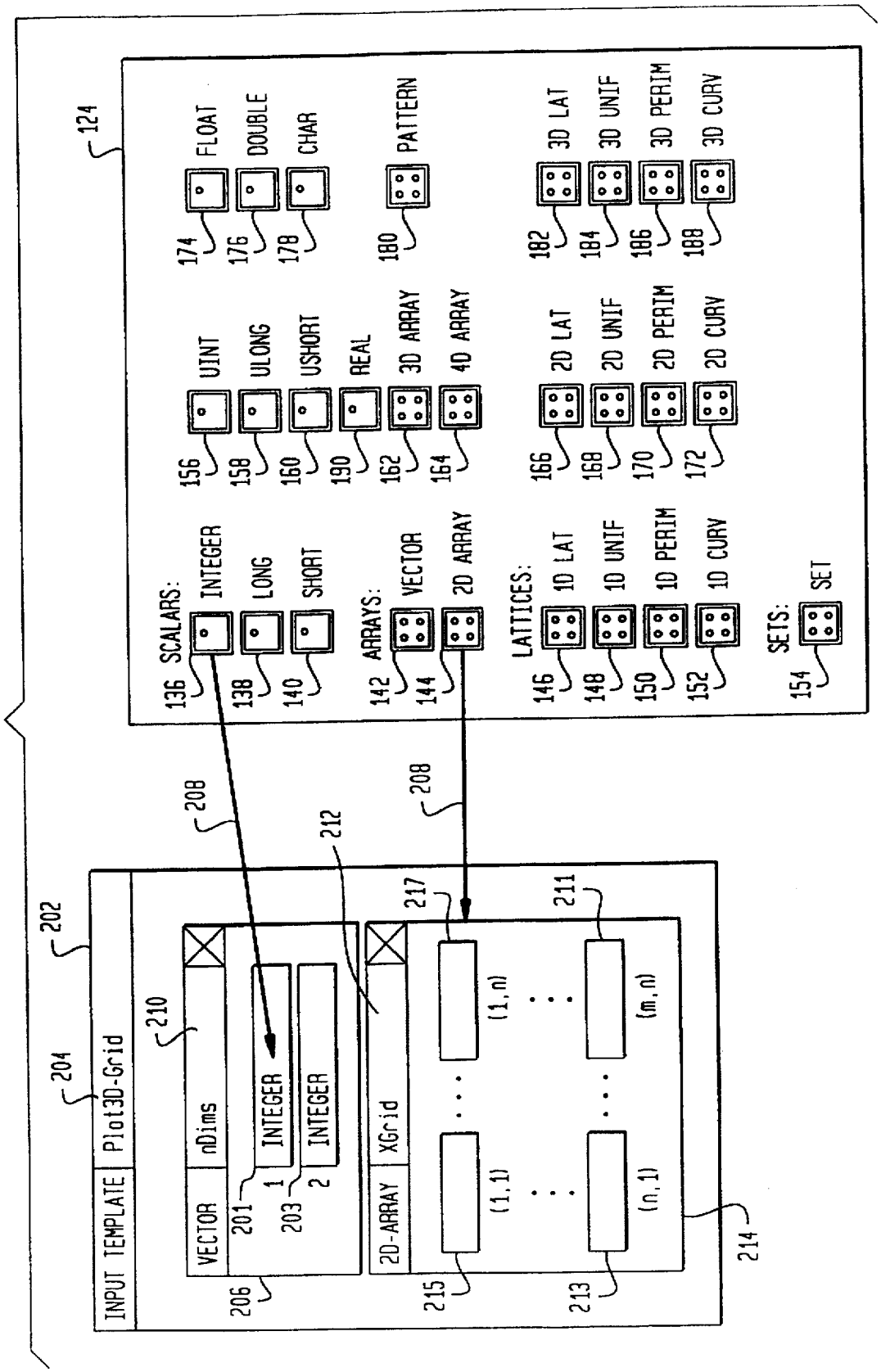
FIG. 7 illustrates a placement of an integer element in a vector array item, and placement of a two-dimensional array item into an input template grid file.

Referring to FIG. 7, an Integer data type 136 glyph, is placed by the "drag and drop" technique 208 so as to form integer element 201 of vector item 206. By changing the n value 205 of the vector item 206 to 2 and dropping and dragging the Integer data type 136 glyph onto element 203 of the vector item 206, it is specified that this is to be a 2-vector of integers.

Thereafter, a two-dimensional array item 214 is created by dropping and dragging the 2-D Array data type 144 glyph from the data palette 124 onto the PLOT3D-Grid input template 202. This is done so as to place the two-dimensional array item 214 below the nDims vector item 206 as illustrated in FIG. 7. The two-dimensional array item 214 is then given the appropriate name X-Grid 212.

Figure 8:
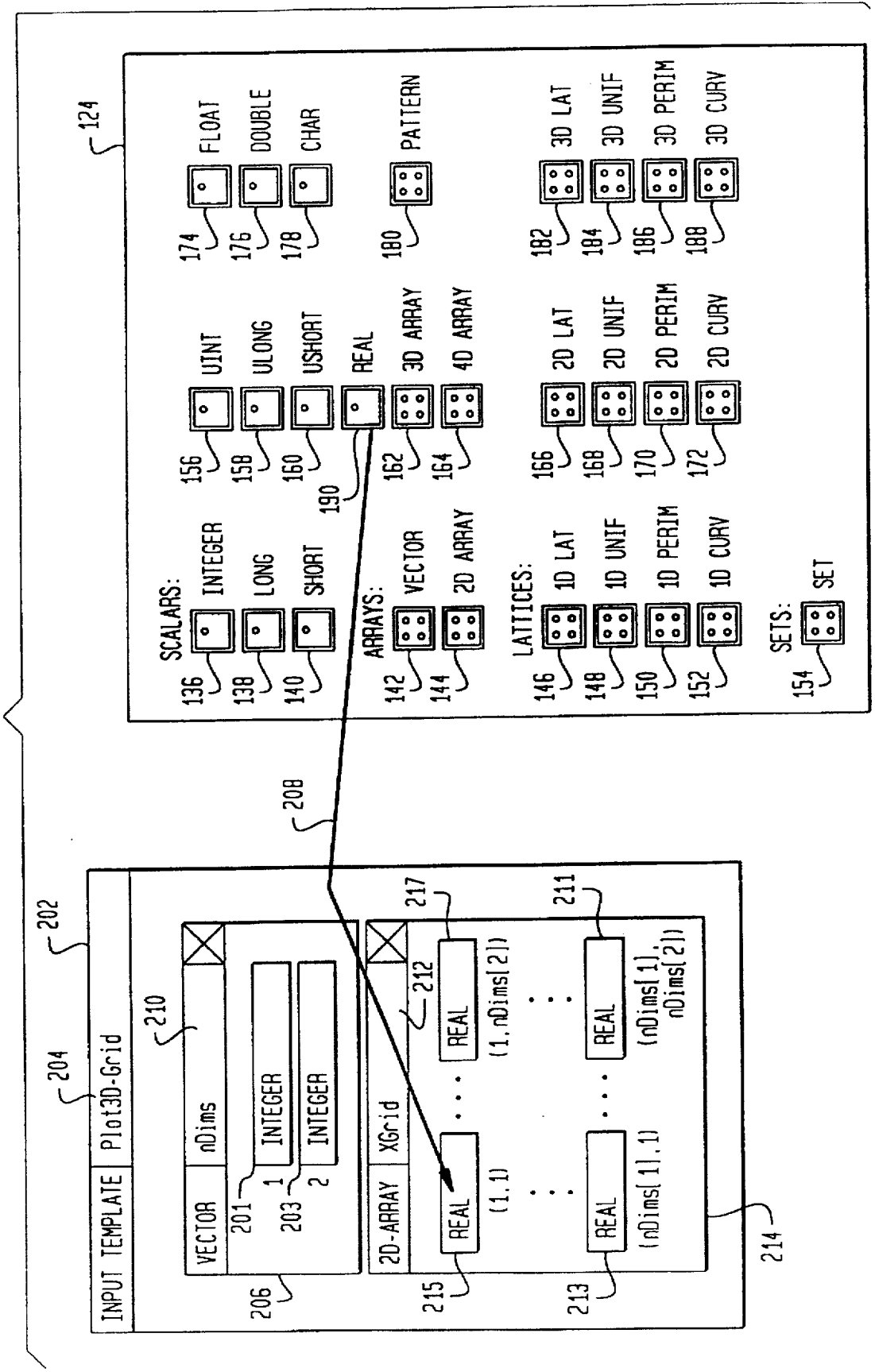
FIG. 8 illustrates the placement of a Real element in a two-dimensional array item and specification of the element coordinates of a two-dimensional array item.

Referring to FIG. 8, the dimensions of the two-dimensional array item 214 are specified by changing the coordinates of the last element 211 of the two-dimensional array 214 to (nDims[1], nDims[2]), and by placing a Real data type 190 glyph within the first element 215 of the two-dimensional array 214.

Figure 9:
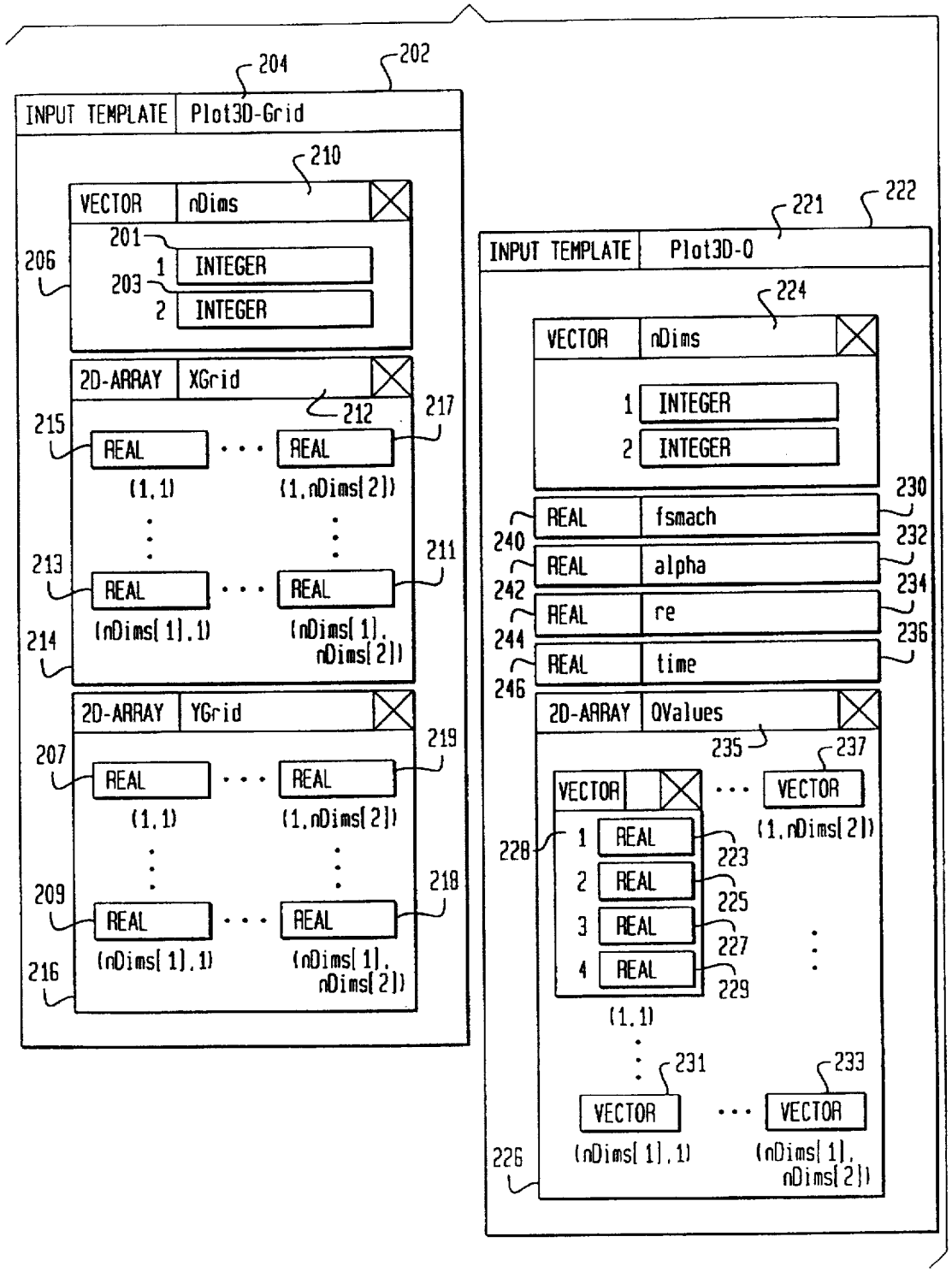
FIG. 9 illustrates the creation and assembly of an input template grid file.

Referring to FIG. 9, a second two-dimensional file 216, named Y-Grid 218, is formed within the PLOT3D-Grid input template 202. This is accomplished by: creating a two-dimensional array item 216 from duplication of the X-Grid item 214; moving the duplication below the X-Grid item 214; and naming the newly formed two-dimensional array item 216 to Y-Grid 218.

A complete description of the PLOT3D-Grid template 202 has now been created. A template for the Q-file 222 must now be created in order to completely describe the input data structure.

Referring to FIG. 9, an input template for the Q-file is constructed. First, the Q-file input template 222, named PLOT3D-Q 221, is created. Second, the nDims vector 206 of the PLOT3D-Grid input template 202 is placed within the Q-file input template 222 since both are identical. Third, four Real data type 190 glyphs are placed within the PLOT3D-Q template 222 to create items which are referred to by reference numerals 240, 242, 244, and 246, respectively. These items are named "fsmach" 230, "alpha" 232, "re" 234 and "time" 236. Fourth, the X-Grid two-dimensional array item 214 of the PLOT3D-Grid template 202 is copied onto the PLOT3D-Q template 222 and named QValues 235. Fifth, the four Real elements 207, 209, 218, and 219 of the newly copied QValues item 226 are replaced by dragging a vector data type 142 glyph from the data palette 124 to form four vector elements. The four vector elements are referred to by reference numerals 228, 231, 233, and 237, respectively. Sixth, vector element 228 appears in an expanded form and is completely defined changing the size to 4, and dragging a Real data type 190 glyph from the data palette 124 into the vector element 228. The resulting four Real components are referred to with reference numerals 223, 225, 227, and 229.

Figure 10:
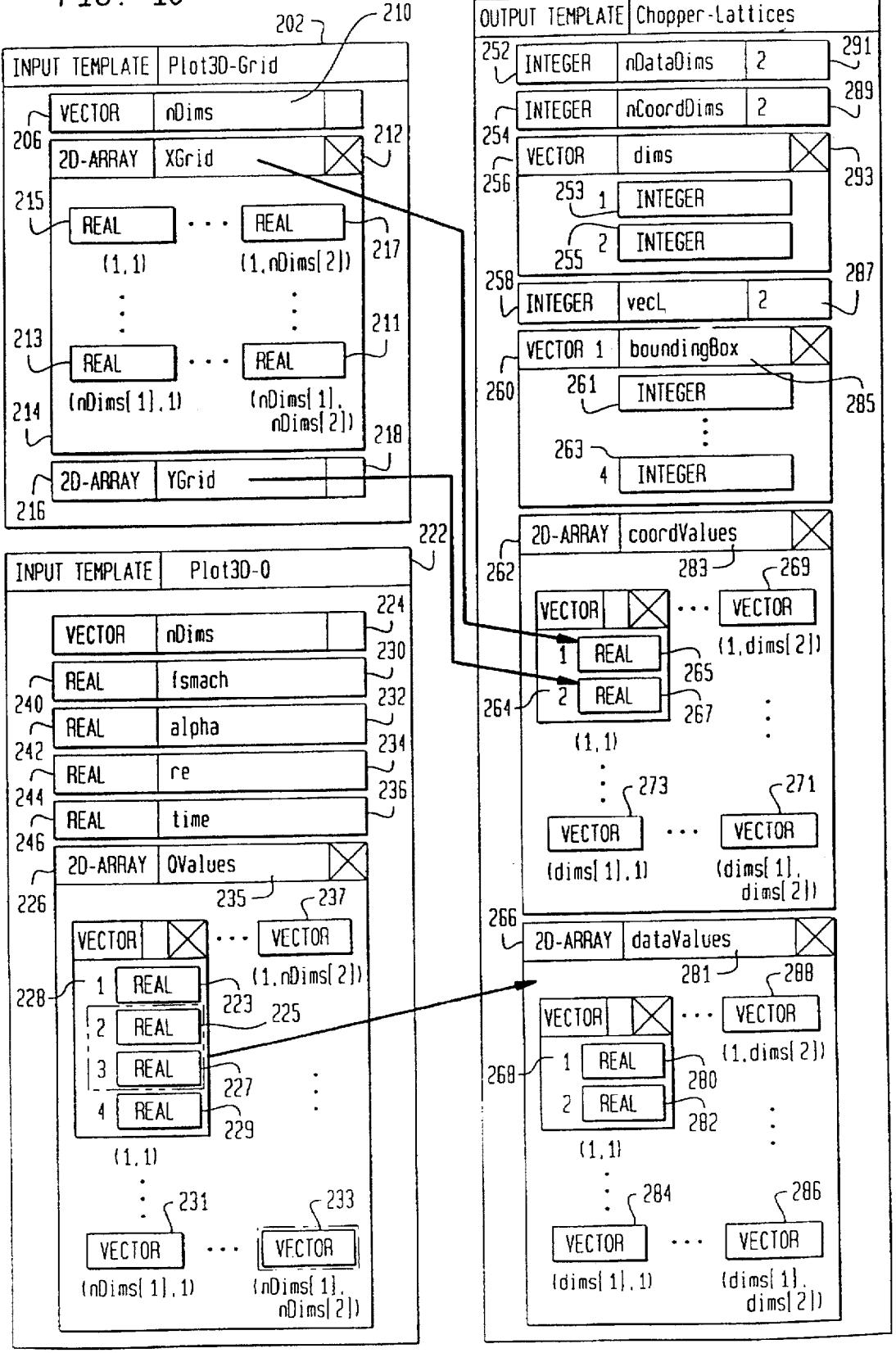
FIG. 10 illustrates an assembled output template that is constructed by assigning pieces of an input template grid file and an input template Q-file.

Referring to FIG. 10, the output template is constructed. The output template 250 is named Chopper-Lattice 251. The output template 250 is produced by creating a new template and dragging a two-dimensional Curve 172 lattice from the data palette 124 into the output template 250. The resulting lattice output template 250 contains: three Integer data items, two vector data items, and two two-dimensional items, which are referred to by the reference numerals 252, 254, 258, 256, 260, 262, and 266, respectively. The resulting lattice output data items are respectively named nDataDims 252, nCoordDims 254, vecLnth 258, dims 293, boundingBox 285, coordValues 283 and data Values 281.

Thereafter, the desired data transformations are assigned from the input templates 202 and 222 to the output template 250. First, the X-Grid item 214 of the PLOT3D-Grid input template 202 is assigned, as the first component 265, to the first vector element 264 of the coordValues item 262 of the output template 250. Secondly, the Y-Grid item 218 of the PLOT3D-Grid input template 202 is assigned, as the second component 267, of the first vector element 264 of the coordValues item 262 of the output template 250. The data editor 98 interprets these gestures as a selection of all the first vector elements of each array element in the coordValues array.

The selection in the PLOT3D-Grid input template 202 can then be assigned to the selection in the output template 250. In addition to recording this assignment, the data editor 98 will attempt to propagate the values of the assignment. In this case, the data editor 98 interprets the new assignment for the size of the coordValues data item 262, and the size designation of the coordsValue data item 262 is dims[1] by dims[2], to propagate the assignment of nDims[1] to dims [1], and nDims[2] to dims[2]. Similarly, the contents of the Y-Grid item 216 is assigned to the second vector element of each array element in coordValues data item 262. No propagation of values occurs in this case as the size of the coordValues data item 262 is not changed by this assignment.

In the event that only the second and third vector elements (the momentum values) of the 2D-Array 226 of the PLOT3D-Q input template 222 are desired to be assigned, as illustrated in FIG. 10, the following actions are undertaken. The second component 225 and third component 227 of the first vector element 228 in the QValues item 226 are selected from the QValues data item 226 of the Plot3D-Q template 222. Thereafter, the selections are assigned to the data Values data item 266 of the output template 250. Since the description of the data transform is completed, it is processed by the data scribe module 94. In turn, the data scribe module 94 will convert input templates 202 and 222 into the lattice specified by the output template 250.

Assignments are accomplished by progressively defining a source selection and a target selection, and then establishing an assignment between the two selections. For instance, if only half of the data structure in the PLOT3D-Grid file 202 input is desired, the third element 211 of the X-Grid item 214 can be redefined as (nDims[1]/2, nDims[2]/2). This redefinition results in only half the values of the X-Grid item 214 being copied to the coordValues item 262.

Operators can be applied, where relevant, to a selection by selecting an appropriate operator from the operators' menu. Operators that can be applied in this fashion include sum, count, diagonal, column, and row.

A data transform may contain several output templates. For a template of this form, a particular output data template may be selected and produced by the data scribe module 94.

Each of the items of an input file may be selected, such as the input PLOT3D-Q file template 222, as a separate lattice. Thus, for the data structure specified by the output template 250, three output templates may be defined. The lattice chosen to be output by the conversion system may then be any one of the three output templates, or any combination thereof.

The data scribe module 94 executes a data transform program, and converts an input data structure into the desired output structure. To employ a data scribe module 94 in a network, a generic data scribe module is added into the network. Before this generic data scribe module can do useful work, it must first be given a data transform program by the user. Any valid data transform program in the data transform library may be chosen. Upon receipt of a data transform program, the generic data scribe module configures itself into the desired data scribe module, including the appropriate set of input and output ports. The data scribe module 94 in a saved network remembers its data transform, so this customizing needs only be done once.

A different data transform my be selected which, in turn, modifies the data scribe module 94. Modifications to a data scribe module 94 can be accomplished by invoking the data editor 98. The data editor 98 will modify a data transform currently within the conversion system, and then use the modified data transform to extract the new data of interest.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. A computer system for transforming input data according to a selected data transformation and providing output data representative thereof, comprising:

a user-interface for receiving inputs by a user and generating outputs representative thereof, said user-interface including:

an interactive display means for displaying menu options allowing the user to select, modify, and construct at least one graphic display input template and at least one graphic display output template, each template being comprised of data items, to identify at least one source data item in said at least one input template and at least one target data item in said at least one output template, and to make at least one assignment between said at least one source data item and said at least one target data item identifying the selected data transformation, wherein said user-interface provides outputs representative of each assignment for the selected data transformation;

a user-interface manager which receives outputs from said user-interface representative of each assignment for the selected data transformation and generates assignment messages representative of said selected data transformation;

a processing means for receiving said assignment messages from said user-interface manager and for generating a data transform program corresponding to said selected data transformation;

a data chopping module receiving said input data and said data transform program generated by said processing means, wherein said data chopping module interprets and executes said data transform program on said input data to obtain said output data;

wherein said processing means comprises a visual manager unit and a visual compiler;

said visual manager unit being connected between said user interface and said visual compiler to receive said assignment messages from said user-interface manager and to send instructions and display information to said user-interface manager, wherein said visual manager unit generates a program corresponding to the data transformation identified by said assignment messages, and outputs said program to said visual compiler; and said visual compiler compiles said program generates by said visual manager unit into said data transform program and outputs said data transform program to said data chopping module.

2. A computer system as recited in claim 1, wherein said data transform program output by said visual compiler comprises code fragments corresponding to each input and output template and a data reference table corresponding to each output template, whereby, said data chopping module when executing said code fragments and said data reference table only transforms input data referenced by said assignment information to obtain said output data.

3. A computer system as recited in claim 2, wherein said data chopping module comprises an executive processor for controlling the operation of a code interpreter and a port manager in accordance with the data transform program output from said visual compiler.

4. A computer system as recited in claim 1, further comprising a data transform program library connected to said visual manager unit, said data transform program library comprising memory for storing information on at least a portion of a data transform program, wherein said visual manager unit further retrieves information from said library memory and includes said retrieved information in generating said program.

5. A computer system as recited in claim 1, wherein said visual manager unit propagates a new assignment by the user by updating previous assignments by the user which have at least one source data item in common with said new assignment.

6. A computer system as recited in claim 1, further comprising a data browser module coupled to said data chopping module for browsing said output data after the selected data transformation has been performed when said data chopping module executes said data transform program on said input data to obtain said output data.

7. A computer system as recited in claim 1, wherein said menu options displayed by said interactive display means comprise a dialogue window for inputting template properties including at least one of a template name, an input or output template direction, an ASCII or binary type, and a source programming language type; and a data palette displaying a group of data items including at least one of a scalar, an array, a lattice, and a set.

* * * * *